US012790090B2

(12) United States Patent
Kuiper et al.

(10) Patent No.: US 12,790,090 B2
(45) Date of Patent: Nov. 10, 2026

(54) BIODEGRADABLE AND COMPOSTABLE FOOD PACKAGING UNIT FROM A MOULDED PULP MATERIAL WITH A CELLULOSE-BASE LAMINATE LAYER, AND METHOD FOR MANUFACTURING SUCH FOOD PACKAGING UNIT

(71) Applicant: Huhtamaki Molded Fiber Technology B.V., Leeuwarden (NL)

(72) Inventors: Harald John Kuiper, Heerenveen (NL); Jan Hendrik Timmerman, Brucht (NL)

(73) Assignee: Huhtamaki Molded Fiber Technology B.V., Leeuwarden (NL)

(*) Notice: Subject to any disclaimer, the term of this patent is extended or adjusted under 35 U.S.C. 154(b) by 1232 days.

(21) Appl. No.: 17/041,139

(22) PCT Filed: Mar. 28, 2019

(86) PCT No.: PCT/NL2019/050196
§ 371 (c)(1),
(2) Date: Sep. 24, 2020

(87) PCT Pub. No.: WO2019/190324
PCT Pub. Date: Oct. 3, 2019

(65) Prior Publication Data

US 2021/0114789 A1 Apr. 22, 2021

(30) Foreign Application Priority Data

Mar. 29, 2018 (NL) ..................................... 2020687
Jul. 17, 2018 (NL) ..................................... 2021326

(51) Int. Cl.
*B29L 31/00* (2006.01)
*B29C 70/02* (2006.01)
(Continued)

(52) U.S. Cl.
CPC .......... *B65D 65/466* (2013.01); *B29C 70/021* (2013.01); *B65D 1/34* (2013.01);
(Continued)

(58) Field of Classification Search
CPC ...... D21H 17/53; D21H 27/10; B65D 85/322; B65D 1/34; B29K 2067/04; B29K 2067/046
See application file for complete search history.

(56) References Cited

U.S. PATENT DOCUMENTS 4,337,116 A * 6/1982 Foster ..................... B32B 27/10
428/36.1
6,183,596 B1 * 2/2001 Matsuda ................ D21H 27/38
162/100
(Continued)

FOREIGN PATENT DOCUMENTS

GB 2449507 11/2008
GB 2477733 8/2011
(Continued)

OTHER PUBLICATIONS

EuroPlas Blog, "Why Calcium Carbonate Used in Plastic Industry", accessed Jun. 5, 2025, https://europlas.com.vn/en-US/blog-1/why-calcium-carbonate-used-in-plastic-industry (Year: 2025).*

*Primary Examiner* — Michael C. Romanowski
(74) *Attorney, Agent, or Firm* — MH2 Technology Law Group, LLP

(57) ABSTRACT

The present invention relates to a biodegradable food packaging unit (2) from a moulded pulp material and a method for manufacturing such biodegradable packaging unit. The packaging according to the invention comprises a food receiving or carrying compartment having a food contact surface, wherein the moulded pulp material comprises an amount of a biodegradable aliphatic polyester; wherein the food contact surface comprises a cellulose-based laminate
(Continued)

layer (10); and wherein the food packaging unit is a compostable food packaging unit. In a preferred embodiment the amount of biodegradable aliphatic polyester is in the range of 0.5-20 wt. %, more preferably in the range of 1-15 wt. %.

11 Claims, 9 Drawing Sheets

(51) Int. Cl.

| | |
|---|---|
| ***B65D 1/34*** | (2006.01) |
| ***B65D 65/46*** | (2006.01) |
| ***B65D 85/32*** | (2006.01) |
| *B29C 70/88* | (2006.01) |

(52) U.S. Cl.

CPC .......... *B65D 85/322* (2013.01); *B29C 70/887* (2013.01); *B29C 2791/002* (2013.01); *B29L 2031/7166* (2013.01); *B65D 2565/382* (2013.01); *Y02W 90/10* (2015.05); *Y10T 428/1303* (2015.01); *Y10T 428/1372* (2015.01)

(56) References Cited

U.S. PATENT DOCUMENTS

| | | | | |
|---|---|---|---|---|
| 2003/0136537 | A1* | 7/2003 | Frederiksen | D21J 7/00 162/410 |
| 2006/0275563 | A1 | 12/2006 | Duffy | |
| 2010/0024998 | A1* | 2/2010 | Wildlock | D21H 27/38 162/124 |
| 2010/0044267 | A1* | 2/2010 | Tolibas-Spurlock | B32B 9/02 156/245 |
| 2011/0139660 | A1* | 6/2011 | Cabell | B65D 21/0233 156/212 |
| 2012/0251818 | A1* | 10/2012 | Axrup | D21H 11/18 428/326 |
| 2013/0004687 | A1* | 1/2013 | Oomori | D21H 19/52 428/220 |
| 2013/0045392 | A1* | 2/2013 | Langlois | D21H 17/53 525/450 |
| 2013/0071677 | A1* | 3/2013 | Penttinen | B32B 27/306 427/407.1 |
| 2013/0260143 | A1* | 10/2013 | Oomori | C09D 133/06 428/479.3 |
| 2017/0008226 | A1* | 1/2017 | Nevalainen | B29C 66/4322 |
| 2017/0008227 | A1* | 1/2017 | Räsänen | B29C 71/04 |
| 2017/0158422 | A1* | 6/2017 | Andreae | B65B 29/022 |
| 2017/0362005 | A1 | 12/2017 | Tolibas-Spurlock | |
| 2019/0062998 | A1* | 2/2019 | Chen | B65D 65/38 |
| 2020/0181849 | A1* | 6/2020 | Esgueva Gutierrez | B32B 7/06 |

FOREIGN PATENT DOCUMENTS

| | | | | | |
|---|---|---|---|---|---|
| GB | 2477733 | A | * | 8/2011 | C08L 67/04 |
| JP | 2007211129 | A | * | 8/2007 | |
| WO | WO-0132987 | A1 | * | 5/2001 | D21J 7/00 |
| WO | 2010064899 | | | 6/2010 | |
| WO | 2016130006 | | | 8/2016 | |
| WO | WO-2018021907 | A1 | * | 2/2018 | D21J 3/00 |

* cited by examiner

BIODEGRADABLE AND COMPOSTABLE FOOD PACKAGING UNIT FROM A MOULDED PULP MATERIAL WITH A CELLULOSE-BASE LAMINATE LAYER, AND METHOD FOR MANUFACTURING SUCH FOOD PACKAGING UNIT

The present invention relates to food packaging units from a moulded pulp material. Such food packaging unit may relate to cases, boxes, cups, plates, carriers, sip lids etc.

Packaging units that are made from a moulded pulp material are known. Such moulded pulp often originates from recycled paper material and/or virgin fibres. These packaging units are used to store, transport and/or display a range of product, including food products such as eggs, tomatoes, kiwi's.

Packaging units that come into contact with food products are subject to many restrictions. This often requires providing an additional film layer on or in the packaging unit, with the film layer acting as a barrier. This barrier separates the food product from the moulded pulp material of the packaging unit.

One of the problems with such food packaging units comprising an additional film layer is that the packaging units are often not sustainable, or at least not fully sustainable. Furthermore, this use of an additional film layer also puts restrictions on the recycling possibilities.

The present invention has for its object to obviate or at least reduce the above stated problems in conventional food packaging units and to provide a food packaging unit that is more sustainable and/or has improved recycling possibilities.

For this purpose, the present invention provides a food packaging unit from a moulded pulp material, the packaging unit comprising a food receiving or carrying compartment having a food contact surface, wherein the moulded pulp material comprises an amount of a biodegradable aliphatic polyester; wherein the food contact surface comprises a cellulose-based laminate layer; and wherein the food packaging unit is a compostable food packaging unit.

The food packaging unit according to the invention comprises a compartment capable of receiving or carrying or holding a food product.

For example, a food receiving compartment may relate to a compartment capable of holding a food product, such as eggs, tomatoes, kiwis, or a container for holding a beverage. A carrying compartment may relate to a carrier surface whereon or wherein a food product can be placed, such as a plate, cup, bowl, bottle divider etc.

In the context of this invention degradable relates to degradation resulting in loss of properties, while biodegradable relates to degradation resulting from the action of microorganisms such as bacteria, fungi and algae. Compostable relates to degradation by biological process to yield $CO_2$, water, inorganic compounds and biomass.

The food packaging unit according to the invention is preferably compostable thereby providing a sustainable packaging unit. This provides a biodegradable alternative material to plastics, for example. This improves recycling properties of the packaging units that are made from moulded pulp (including so-called virgin fiber material and/or recycled fiber material) and comprise a biodegradable aliphatic polyester.

The food packaging unit according to the present invention further comprises a cellulose-based laminate layer and is provided on the food contact surface of the food packaging unit. Preferably, the cellulose-based laminate layer comprises cellulose fibres that may originate from virgin (wood) fibers and/or recycled fibers and/or other suitable cellulose sources. Preferably, the cellulose fibres are hammered to improve their properties. Optionally, the laminate layer is prepared by exposing paper pulp to sulphuric acid and/or $ZnCl_2$ to provide a layer with high density, stability and heat resistance. Optionally, the layer can be siliconized to further improve its properties.

It was shown that by applying a cellulose-based laminate layer the overall properties of the packaging unit were improved. This also relates to the so-called wipeability of the packaging unit. Wipeability relates to the possibility to remove stains from the surface and reducing or even preventing penetration into the material. These properties also relate to grease resistance such that the chemical properties of the packaging unit can be remained during its use.

As a further advantage, the packing unit with the cellulose-based laminate layer renders it possible to provide the packing unit with a paper look and paper feel. This improves consumer perceptance of the packing unit.

As an even further advantage, the packaging unit with the cellulose-based laminate layer maintains the biodegradability and/or compostable properties of the packing unit as it obviates the need for the use of fluorochemicals.

Optionally, additional additives can be added to further improve the packaging unit properties. For example an amount of AKD can be provided to improve the water repellence.

An even further advantage when applying a cellular-based laminate layer is the insulating effect that is provided to the food packaging unit. This is especially relevant in case of instant meals that are heated in a magnetron, for example conventional packaging units heat up to a temperature of 90-100° C. with the similar packaging unit that is provided with a cellulose-based laminate layer heating up to 50-70° C. This improves the safety of using such meals. Experiments showed that it was possible to achieve a temperature resistance of the packing units up to 220° C.

In a preferred embodiment of the invention a cellulose-based laminate layer is melted or fused with the biodegradable aliphatic polyester.

By providing a heat step the cellulose fibres are melted or fused to the biodegradable aliphatic polyester fibres. This improves the adherence/connection of the cellulose-based laminate layer to the packaging unit. This heating step can be performed in a press that pushes the laminate layer into the correct shape onto the food contact surface. Alternatively, in one of the presently preferred embodiments of the invention, the laminate layer is provided inside the mould wherein the package unit is manufactured from the moulded pulp material. The cellulose-based laminate layer is provided in the mould onto the packaging unit. The food packaging unit with the laminate layer can be dried in the mould involving a so-called in-mould drying operation or can alternatively be dried in an additional separate drying step after releasing the product from the mould.

The laminate layer can be provided applying pre-stress to the laminate layer. In another embodiment, to reduce the risk of providing a laminate layer with reduced thickness in the corners of the packaging unit, the laminate layer is designed and shaped according to the desired dimensions and thereafter provided to the packaging unit. This may involve cutting the design of the laminate layer and folding the laminate layer onto the food surface contact. Thereafter, in one of the presently preferred embodiments, the heating step is performed to melt or fuse the materials together.

A further advantage of adding an amount of biodegradable aliphatic polyester is that the packaging unit can also be decomposed using microorganisms in soil, for example. This enables decomposing the food packaging unit, comprising a biodegradable aliphatic polyester, as a whole. In such preferred embodiment, the food packaging unit can be decomposed at home, thereby rendering the food packaging unit home-compostable. Such home-compostable packaging unit further improves the overall sustainability of the packaging unit of the invention. This enables replacing the use of less sustainable materials, such as CPET, PP, PE, PS, aluminium in food packaging units.

The biodegradable aliphatic polyester can be mixed in the original moulded pulp material such that it is distributed over substantially the entire food packaging unit and/or can be provided as a separate layer on the side of the food packaging unit that may come into contact with a food product, for example.

A further advantage of the present invention is the improvement of barrier properties, in addition to the property improvements that were mentioned earlier. Barrier properties may include oxygen and/or grease barriers. Also, the penetration of oil originating from the food product, such as pasta or French fries, into the food packaging unit can be reduced. Furthermore, in the production of (Chinet) disposable tableware the fluorine chemistry can be reduced or even omitted from the manufacturing process. Also, water barrier properties can be improved to reduce the penetration of water into the packaging unit and thereby reducing ridging problems, for example.

Another advantage when using a biodegradable aliphatic polyester in a food packaging unit is the constancy of size or dimensional stability.

As a further advantage of the use of a biodegradable aliphatic polyester, the so-called heat seal ability of the packaging unit is improved. This further improves food packaging characteristics.

An even further advantage of introducing an amount of a biodegradable aliphatic polyester in a food packaging unit is that the properties of the packaging unit can be adjusted by mixing or blending the main biodegradable aliphatic polyester with other polymers or agents. Also, it is possible to prepare the biodegradable aliphatic polyester material for (paper) coating and printing. Furthermore, in some embodiments, digital printing may be applied to the laminated trays to reduce the total cost of the packaging unit. This further improves the sustainability of the packaging unit. Also, a paper look may be achieved.

A further effect that is achieved with the packaging unit according to the invention is the improved insulation. This improves the so-called "cool-to-touch" characteristic of the packaging unit. This is beneficial when heating the unit in an oven or microwave, for example. This prevents a consumer from being injured when removing a packaging unit from the oven. More specifically, "cool-to-touch" relates to an outside packaging temperature in the range of 10-30° C. after heating the product in an oven, for example. This is a lower temperature as compared to conventional CPET packaging units, for example. Therefore, the packaging unit according to the invention is more safe in use. In addition, the wipe ability (cleaning possibilities in particular for cleaning/wiping the outer surface of the packaging unit) was improved, and more possibilities for masking (hiding) undesirable stains and/or promoting the compostable effect of the packaging unit were achieved.

In one of the presently preferred embodiments of the invention, the amount of biodegradable aliphatic polyester in the food packaging unit is in a range of 0.5-20 wt. %, more preferably in the range of 1-15 wt. %.

By applying an amount of biodegradable aliphatic polyester in one of the aforementioned ranges, the sustainability and packaging characteristics of the food packaging unit according to the present invention is significantly improved.

In a further preferred embodiment of the invention the amount of biodegradable aliphatic polyester is in the range of 2-10 wt. %, preferably in the range of 5-9 wt. %, and most preferably in the range of 6.5-8 wt. %.

Applying an amount of biodegradable aliphatic polyester in these ranges provides packaging units that are both stable and strong. Preferably, the material is sufficiently refined to further enhance the desired characteristics. Especially, applying a refining energy of about 150 kWh/ton material showed a good effect in the mentioned range(s) of biodegradable aliphatic polyester. As a further effect, an overall weight reduction of the packaging unit can be achieved of up to about 20% without affecting the strength and stability of the packaging unit as compared to conventional products, such as CPET or PP trays or the like.

As mentioned earlier, the food packaging unit may comprise one or more further agents in addition to the use of biodegradable aliphatic polyester. This enables a specific design of the food packaging unit characteristics and properties according to customer's specifications or needs taking into account the specific food product.

Preferably, the one or more further agents comprise a biodegradable aliphatic polyester. The use of such biodegradable aliphatic polyester achieves that the food packaging unit maintains its sustainability and recycling properties, while improving specific characteristics of the food packaging unit. For example, the biodegradable aliphatic polyester may comprise an amount of one or more of PBS, PHB, PHA, PCL, PLA, PGA, PHBH and PHBV. Preferably, the use of biodegradable aliphatic polyester is combined with the use of further additives or substances that aim at improving or achieving specific properties of the packaging unit. In further presently preferred embodiments the bio-polymers that are applied originate from so-called non-gmo (non-genetically modified organisms) biopolymers. For example, it was shown that the use of PLA in addition to another biodegradable aliphatic polyester may improve the strength and stability of the packaging unit, thereby providing a stronger packaging unit and/or requiring less raw material.

According to one of the preferred embodiments of the invention the biodegradable aliphatic polyester comprises an amount of polybutylene succinate (PBS). PBS is one of the biodegradable aliphatic polyesters. PBS can also be referred to as polytetramethylene succinate. PBS decomposes naturally into water, $CO_2$ and biomass. The use of PBS as a compostable material contributes to providing a sustainable product.

The use of PBS is possible in food-contact applications including food packaging units from a moulded pulp material. An advantage of the use of PBS is that the decomposition rate of PBS is much higher as compared to other agents or components such as PLA (including variations thereof such as PLLA, PDLA and PLDLLA, for example). Therefore, the use of PBS in a food packaging unit from moulded pulp significantly improves the sustainability of the packaging unit. This improves recycling possibilities and biodegrading or decomposing the packaging unit. For example, the use of PBS in lid seals may obviate the need for non compostable PE as inner liner.

Preferably, in one of the embodiments of the invention the packaging unit comprises an amount of micro fibrillated cellulose (MFC) sometimes also referred to as nanofibrillar cellulose or cellulose nanofibers. MFC preferably originates from cellulose raw material of plant origin. The use of MFC enhances the fiber-fiber bond strength and further improves the reinforcement effect. Although MFC is preferably applied in combination with one or more of the biodegradable aliphatic polyesters, it is also possible to use MFC as an alternative to these components.

In an embodiment of the invention the bio-polymers and/or MFC provide a biofilm on or at (a part of) the surface of the packaging unit. Experiments indicate that good barrier properties can be achieved. Alternatively, or in addition thereto, a paper look and/or paper feel surface layer can be provided. For example, a paper layer can be sealed onto a thin layer of (bio)film or a thin layer of biofilm or biopolymer can be coated or laminated onto the paper layer. The biopolymer layer can be sealed onto the surface of a tray or container for food, for example. This paper look and/or paper feel surface layer contributes to the consumer's appreciation of the packaging unit according to such embodiment of the invention. Tests have shown a good wet strength and barrier properties. Barrier properties may include oxygen and/or grease barriers. It is believed that the oxygen barrier properties are achieved by the ability of MFC to form a dense network involving hydrogen bonds.

Optionally, some hydrophobic elements are added to an MFC layer to further improve the water barrier properties. This may involve modification of the hydroxyl groups, for example on the surface of the micro fibrils chemically and/or by absorption of polymers, for example.

A further advantage of the use of MFC is the improved printability, including digital printing possibilities. In addition or as an alternative, MFC may reduce cost by reducing the weight or grammage by increasing the amount of fillers. This may also enhance the optical properties.

It will be understood that combinations of MFC and/or biodegradable aliphatic polyesters may further improve the mentioned effects and advantages. Also, combinations with conventional polymer films, for example by coating MFC and/or a biodegradable aliphatic polyester thereon, may provide a product with the advantages of both types of material.

In a further preferred embodiment of the invention, the packing unit comprises a layer of biodegradable aliphatic polyester on a food contact surface to improve melting or fusing of the cellulose-based laminate layer with a packaging unit.

In addition to or as an alternative to providing the biodegradable aliphatic polyester such as PLLA into the moulded pulp material, an additional layer of this biodegradable material can be provided on the food contact surface. This improves the fusing or melting of the cellulose-based laminate layer onto the food contact surface. Actually, the optional layer of biodegradable material functions as binder for the connection between the cellulose-based laminate layer and the packaging unit. This improves the strength and stability of the laminate layer and the packaging unit as a whole.

It was shown that in embodiments of the invention the biodegradable aliphatic polyester enhances the adhesive or gluing properties of the moulded pulp material to the laminate layer. In some of the presently preferred embodiments, during manufacturing of the packaging unit, a thin layer of biodegradable aliphatic polyester is provided on the surface of the moulded pulp material to glue the laminate layer effectively to the moulded pulp material. The thickness of this thin layer is preferably in the range of 1 to 100 μm.

In a further preferred embodiment of the invention the packaging unit is provided with a circumferential edge comprising a connecting surface that is substantially free of the laminate layer.

In some embodiments packaging units are provided with a (transparent) seal, foil, film, sheet or liner closing the opening of the packaging unit. In fact, this layer acts as a closure to the packaging unit. The use of a biodegradable aliphatic polyester such as PBS and/or PLA in packaging units contributes to the adherence of this closure to the packaging unit. In fact the biodegradable aliphatic polyester (partly) acts as an adhesive or glue.

It was shown that this contributes to the hot seal peelability, i.e. removing the transparent layer after the packaging unit is heated in a microwave for example, and/or to the cold seal peelability, i.e. removing the transparent layer when taking the packaging unit from the fridge and before heating for example. Optionally, a thin layer of biodegradable aliphatic polyester is provided to adhere the transparent layer to the edge of the packaging unit. Preferably, the transparent layer is also home compostable. In a presently preferred embodiment the transparent layer comprises an amount or mixture of PBS, PHBT and/or PLA. Optionally, a thin anti-fog layer is provided to improve the transparency of the layer. Also optionally, the transparent layer comprises an amount of PVOH to improve the performance in relation to the $O_2$-permeability. This can advantageously be applied to packaging units for meat and meat products, for example.

In a further preferred embodiment of the invention the cellulose-based laminate layer comprises a colouring agent.

By providing a colouring agent the visual appearance of the packaging unit of the invention can be improved. Furthermore, this can be used to provide a consumer with additional information. For example, Indian meals can be provided in a red coloured packaging unit and Italian food can be provided in a green coloured packaging unit. It will be understood that these examples can be extended to other exchanges of information with a consumer.

Preferably, the colouring agent is biodegradable and more preferably compostable. This maintains the packaging unit as a whole being biodegradable or even compostable.

Optionally, a colouring agent is added to the moulded pulp, preferably a soluble dye. These agents can be cationic or anionic and are in another classification also referred to as basic dyes, direct dyes or acid dyes. In a presently preferred embodiment cationic colouring agents are used.

In addition, or as an alternative, spray coating can be applied to improve the water and/or fat repellence. Preferably, an emulsion is spraid on the packaging unit that builds a thin film layer in the processing of the packaging unit.

In a further preferred embodiment of the invention the cellulose-based laminate layer comprises a print.

By providing a laminate layer with a print the possibilities to provide a consumer with additional information or extended print.

In a presently preferred embodiment a print is provided on the pulp material oriented side of the cellulose-based laminate layer in a mirror image such that the print can be seen from the (other) food side of the cellulose-based laminate layer. This reduces the risk of the printing ink to come in contact with the food.

In one of the preferred embodiments of the invention the food packaging unit is biodegradable. More preferably, the unit is biodegradable at a temperature in the range of 5 to 60° C., preferably in the range of 5-40° C., more preferably in the range of 10-30° C., even more preferably in the range of 15-25° C., and most preferably at a temperature of about 20°

C. This renders decomposing of the packaging unit easier. Furthermore, this enables so-called ambient or at home decomposing of the packaging unit according to the invention. For example, the packaging unit according to the invention may be industrial and/or home compostable according to EN 13432.

Tests with a packaging unit in an embodiment of the invention showed a home compostability wherein the packaging unit decomposed within 24 weeks in accordance with the accepted practical standard.

Optionally, the biodegradable aliphatic polyester, such as PBS, can be manufactured from fossil resources. More preferably, the biodegradable aliphatic polyester, such as PBS, is bio based and made from plant resources, for example. Such bio based biodegradable aliphatic polyester, such as PBS, further improves the sustainability of the food packaging unit.

Optionally, the moulded pulp material can be coloured using additives, dyes (basic dyes, direct dyes, anionic and/or cationic charged dyes), pigments or other components that provide colour to the packaging unit. This enables providing the packaging unit with a colour representative for its (intended) contents.

In a further embodiment of the present invention the packaging unit further comprises an amount of natural and/or alternative fibers.

Providing an amount of natural and/or alternative fibers provides a natural feel to the packaging unit and/or improves the overall strength and stability of the packaging unit. Such natural/alternative fibers may comprise fibers from different origin, specifically biomass fibers from plant origin. This biomass of plant origin may involve plants from the order of Poales including grass, sugar cane, bamboo and cereals including barley and rice. Other examples of biomass of plant origin are plants of the order Solanales including tomato plants of which the leaves and/or stems could be used, for example plants from the Order Arecales including palm oil plants of which leaves could be used, for example plants from the Order Maphighiales including flax, plants from the Order of Rosales including hemp and ramie, plants from the Order of Malvales including cotton, kenaf and jute. Alternatively, or in addition, biomass of plant origin involves so-called herbaceous plants including, besides grass type plants and some of the aforementioned plants, also jute, Musa including banana, Amarantha, hemp, cannabis etcetera. In addition or as an alternative, biomass material origination from peat and/or moss can be applied.

Preferably, the (lignocellulosic) biomass of plant origin comprises biomass originating from plants of the Family of Poaceae (to which is also referred to as Gramineae). This family includes grass type of plants including grass and barley, maize, rice, wheat, oats, rye, reed grass, bamboo, sugar cane (of which residue from the sugar processing can be used that is also referred to as bagasse), maize (corn), sorghum, rape seed, other cereals, etc. Especially the use of so-called nature grass provides good results when manufacturing packaging units such as egg packages. Such nature grass may originate from a natural landscape, for example. This family of plants has shown good manufacturing possibilities in combination with providing a sustainable product to the consumer.

The present invention further relates to a method for manufacturing a food packaging unit from a moulded pulp material, the method comprising the steps of:

preparing moulded pulp material;
adding an amount of biodegradable aliphatic polyester;
moulding the food packaging unit;
providing a cellulose-based laminate layer; and
releasing the food packaging unit from the mould.

Such method provides the same effects and advantages as described in relation to the food packaging unit. In accordance with the invention the cellulose-based laminate layer can be provided before or after releasing the food packaging unit from the mould. In a presently preferred embodiment the layer is provided in an in-mould operation, preferably in combination with an in-mould drying operation.

In a further preferred embodiment the method comprises the additional step of subjecting the packaging unit to a heating step heating the packaging unit to a temperature about the melting temperature of the biodegradable aliphatic polyester to crosslink/interact with the cellulose fibers of the laminate layer to increase strength and improve barrier properties. Preferably, the heating step heats the temperature of the packaging unit to a heating temperature in the range of 145-195° C., preferably in the range of 165-190° C., and most preferably to a temperature of about 180° C.

By adding an amount of biodegradable aliphatic polyester to the moulded pulp material, a packaging unit can be manufactured from a blend comprising fibers and biodegradable aliphatic polyester, and/or a separate layer comprising biodegradable aliphatic polyester, can be achieved. Such separate or additional layer may improve the fusing or melting process.

The method according to the invention provides a food packaging unit that is more sustainable than conventional packaging units that are moulded for food products. Optionally, other bio-material can be used in combination with the main biodegradable aliphatic polyester, such as PBS, PLA or similar biodegradable components. Such combinations or alternatives may provide similar effects and advantages as described in relation to the packaging unit.

Preferably, the method comprises the step of adding an amount of biodegradable aliphatic polyester in the range of 0.5-20 wt. %, more preferably in the range of 1-15 wt. %. Experiments showed that adding an amount of biodegradable aliphatic polyester in these ranges provides a sustainable food packaging unit with appropriate characteristics.

Preferably, in the moulding step of the food packaging unit, the biodegradable aliphatic polyester connects to the celluloid fibres of the moulded pulp material. This provides a food packaging unit with sufficient strength. In a presently preferred embodiment these connections are achieved by activation of the biodegradable aliphatic polyester. This may involve subjecting the packaging unit to about the melting temperature of the biodegradable aliphatic polyester, for example 145-175° C. More specifically, the biopolymers melt and crosslink/interact with the fibers (cellulose) to increase strength and change properties like barrier properties.

In the life cycle of the packaging unit, in the context of the present invention, the manufacturing process of the food packaging unit preferably also comprises the step of biodegrading the packaging unit. Therefore, in relation to the present invention, preferably also the biodegradation of the packaging unit is considered part of the entire manufacturing process. The biodegradation constitutes a significant part of the life cycle in view of the sustainability.

Preferably, the biodegrading comprises decomposing the food packaging unit.

Even more preferably, the decomposing is performed at a temperature in the range of 5-40° C., preferably in the range of 10-30° C., more preferably in the range of 15-25° C., and most preferably at a temperature of about 20° C., thereby relating to ambient decomposing.

In one of the presently preferred embodiments of the invention the manufacturing method further comprises the step of adding one or more further agents in addition to the main biodegradable aliphatic polyester. The agents preferably comprise a biodegradable aliphatic polyester, preferably comprising an amount of one or more of PBS, PHB, PHA, PCL, PLA, PGA, PHBH and PHBV. This further improves the product characteristics, preferably maintaining the sustainable properties. In presently preferred embodiments the bio-polymers that are applied originate from so-called non-gmo (non-genetically modified organisms) biopolymers.

In a further preferred embodiment of the present invention, the method further comprises the step of in-mould drying the packaging unit. In other embodiments, the method involves rough moulding, like in the moulded fiber egg carton production wherein moulded articles are 3D formed, dried and after-pressed. The in-mould drying further improves the overall manufacturing possibilities. As a further effect, the connection between the biodegradable aliphatic polyester and the fibre material is enhanced.

In a presently preferred embodiment the unit is first moulded in moulds, where after the raw unit is transferred to drying moulds to perform the in-mould drying. After drying the unit is released and a high quality product is achieved with a significantly lower surface roughness as compared to conventional products. Surface roughness can be measured using the Bendtsen measurement process, for example.

In one of the presently preferred embodiments the surface roughness is further reduced by providing an amount of a surface roughness reducing agent, in some of these presently preferred embodiments the agent comprising a biodegradable aliphatic polyester.

Preferably, the manufacturing process comprises the step of refining the moulded pulp material, preferably together with the biodegradable aliphatic polyester. The refining step improves the mixing of the materials and fibrillates the fibers. Refining the fibers may reduce fiber length, fibrillates fibers thereby providing more specific surface of fiber branches that improves binding and H-bridge formation which leads to a stronger, stiffer product. In fact, this improves the number and strength of connections between the moulded pulp material and the biodegradable aliphatic polyester such that the overall strength and stability of the packaging unit is improved. This is even further improved when combining the refining step with the heat treatment step to activate the biodegradable aliphatic polyester.

Further advantages, features and details of the invention are elucidated on the basis of preferred embodiments thereof, wherein reference is made to the accompanying drawings, in which.

Figure 1A:
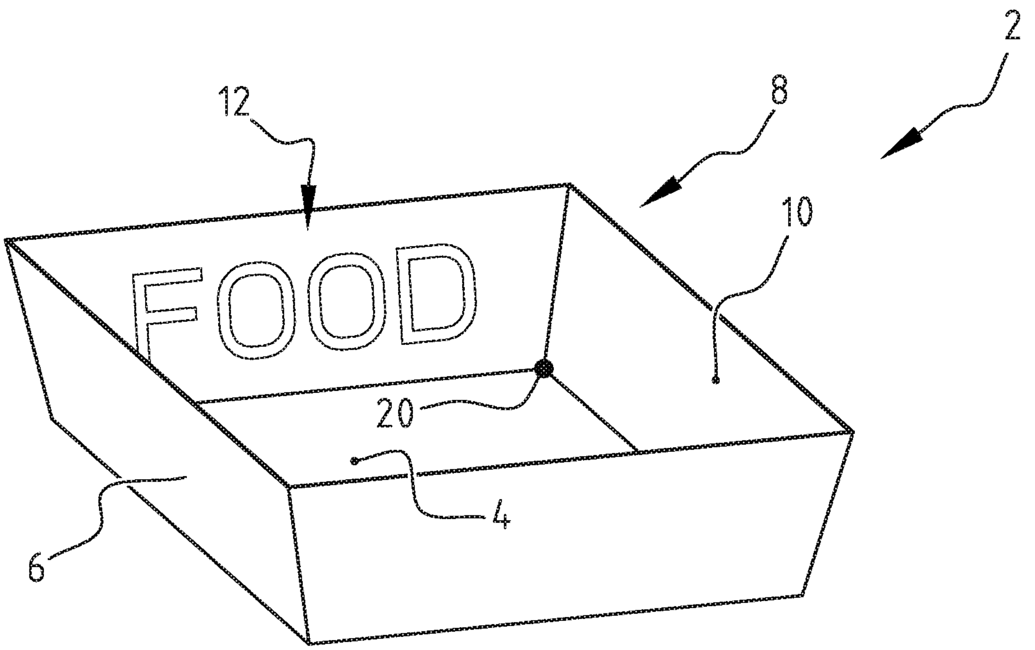
FIGS. 1A and 1B show a packaging unit configured for receiving a food product according to the present invention
Figure 1B:
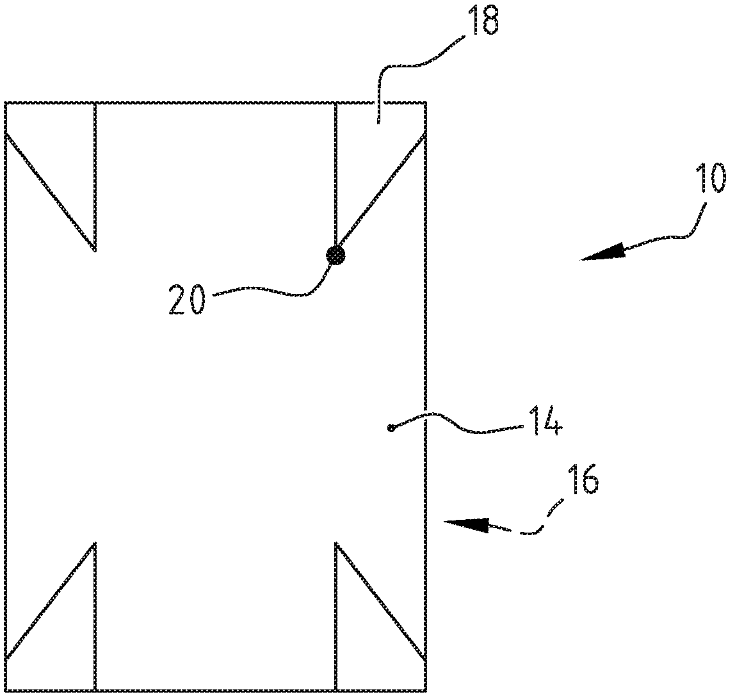

Packaging unit 2 (FIG. 1A) relates to a food receiving container having bottom part 4 and side walls 6 defining opening 8. On the inside of container 2 there is provided cellulose-based laminate layer 10. In the illustrated embodiment layer 10 comprises print 12. Preferably, in the illustrated embodiment the print is provided on the back side of laminate layer 10. Laminate layer 10 (FIG. 1B) comprises a food oriented side 14 and a packaging side 16. In the illustrated embodiment parts 18 can be removed or cut from sheet or layer 10 to dimension laminate layer 10 according to the specifications and enable providing layer 10 into the inside of container 2. This enables positioning laminate layer 10 correctly relative to corners 20. In this illustrated embodiment print 12 is provided in a mirror image on package side 16 of laminate layer 10 to render the render print 12 visible for a user or consumer.

Figure 1C:
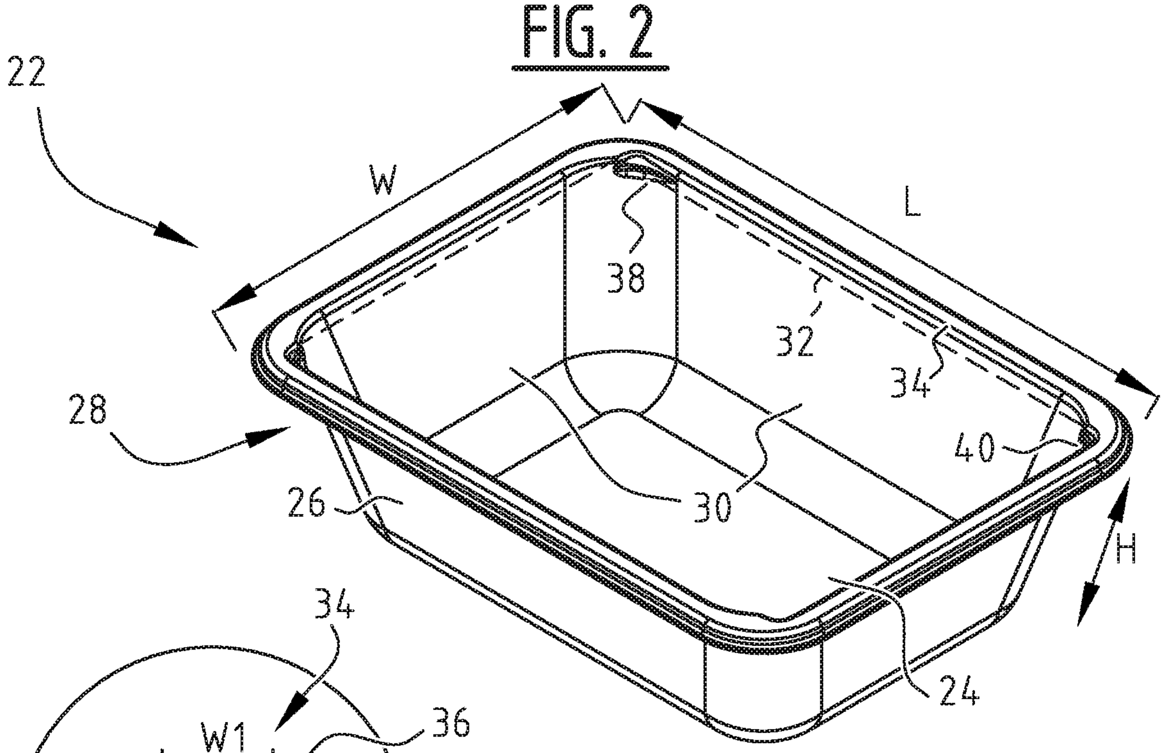
FIGS. 1C and 1D show an alternative packaging unit according to the present invention.
Figure 1D:
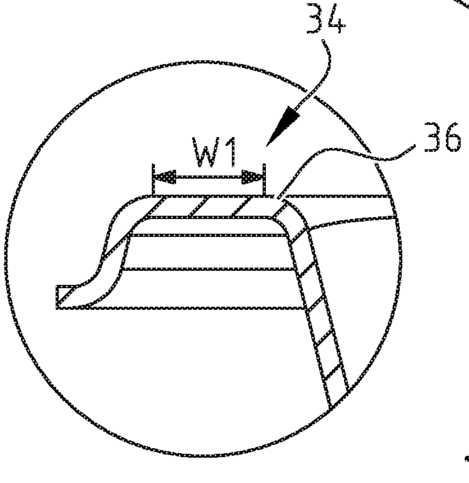

Packaging unit 22 (FIG. 1C) provides a further embodiment of a food receiving container having bottom part 24 and side walls 26 defining opening 28. Packaging unit 22 has length L, width W and height H. On the inside of container 22 there is provided laminate layer 30, optionally comprising a print. In the illustrated embodiment laminate layer 30 is provided on the inside of packaging unit 22 and extends from bottom part 24 up to contour or edge 32. Contour or edge 32 is provided a small distance from the upper side of edge 34. This distance is preferably in the range of 1 to 12 mm. Edge 34 (FIG. 1D) is provided with width W1 that defines contact surface 36 for connecting to a liner or seal. In the illustrated embodiment this liner or seal is connected directly to the moulded pulp material, optionally with an adhesive, in stead of being connected to laminate layer 30. Width W1 is in the illustrated embodiment in the range of 1 to 15 mm, preferably in the range of 2 to 5 mm.

Packaging unit 22 (FIG. 1C) comprises first denesting elements 38 and second denesting elements 40. In the illustrated embodiment denesting elements 38, 40 enable denesting of a stack of packaging units 22. Denesting elements 38, 40 are designed asymmetrically. It will be understood that alternative denesting elements can also be envisaged in accordance with the present invention as alternatives or in combination. These alternative denesting elements can be designed asymmetrically or symmetrically. Asymmetrical denesting elements enable denesting with packaging units 22 in one orientation and disable or at least render denesting more difficult in another orientation. Denesting elements 38, 40 have as an additional advantage that these elements do not significantly change the size of contact surface 36 and/or the internal volume of packaging unit 22. In the illustrated embodiment, denesting elements 38, 40 are provided at or adjacent edge 34. This prevents the provision of marks, edges, protrusions, nocks and the like on or close to bottom part 24. Such irregularities on or close to bottom part 24 hinders cleaning or emptying packaging unit 22.

Figure 2:
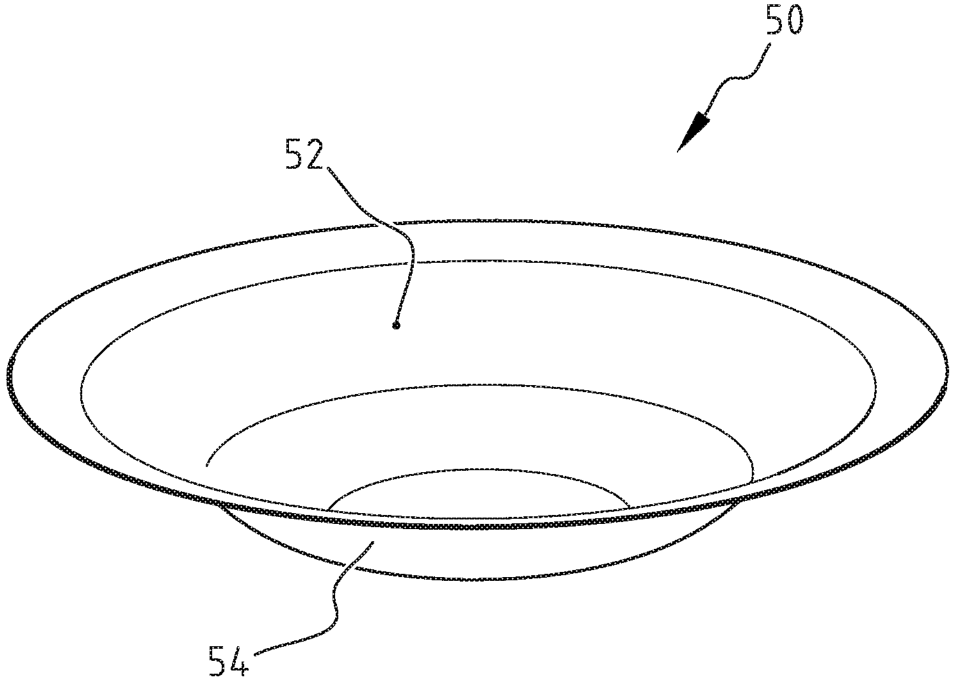
FIG. 2 shows a plate as food receiving product according to the invention.

In another embodiment plate 50 (FIG. 2) is on the food receiving side provided with cellulose-based laminate layer 52. In the illustrated embodiment bottom or back side 54 of plate 50 is not provided with such laminate layer.

Figure 3A:
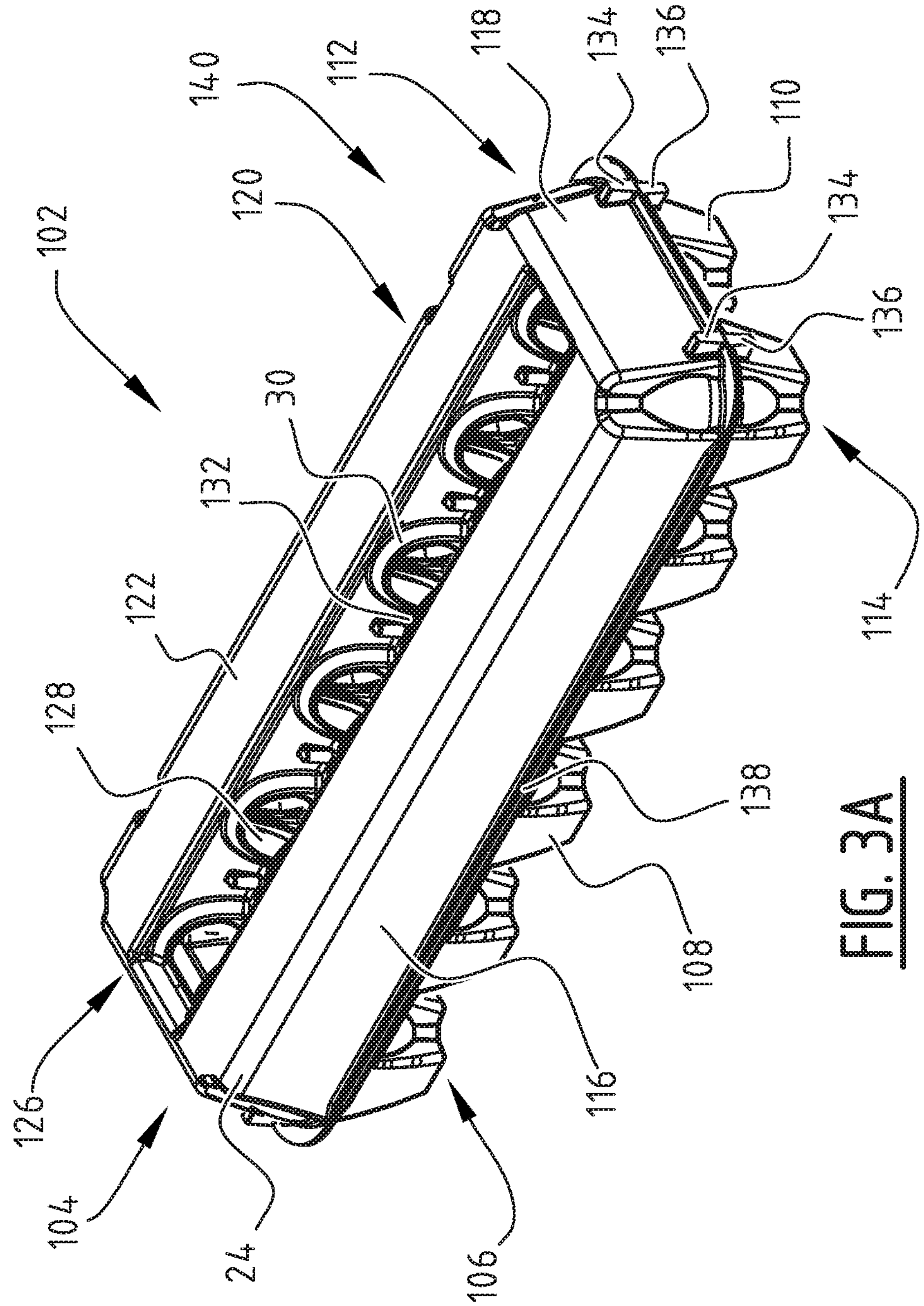
FIGS. 3A and 3B shows a packaging unit according to the invention comprising PBS and/or another biodegradable aliphatic polyester.
Figure 3B:
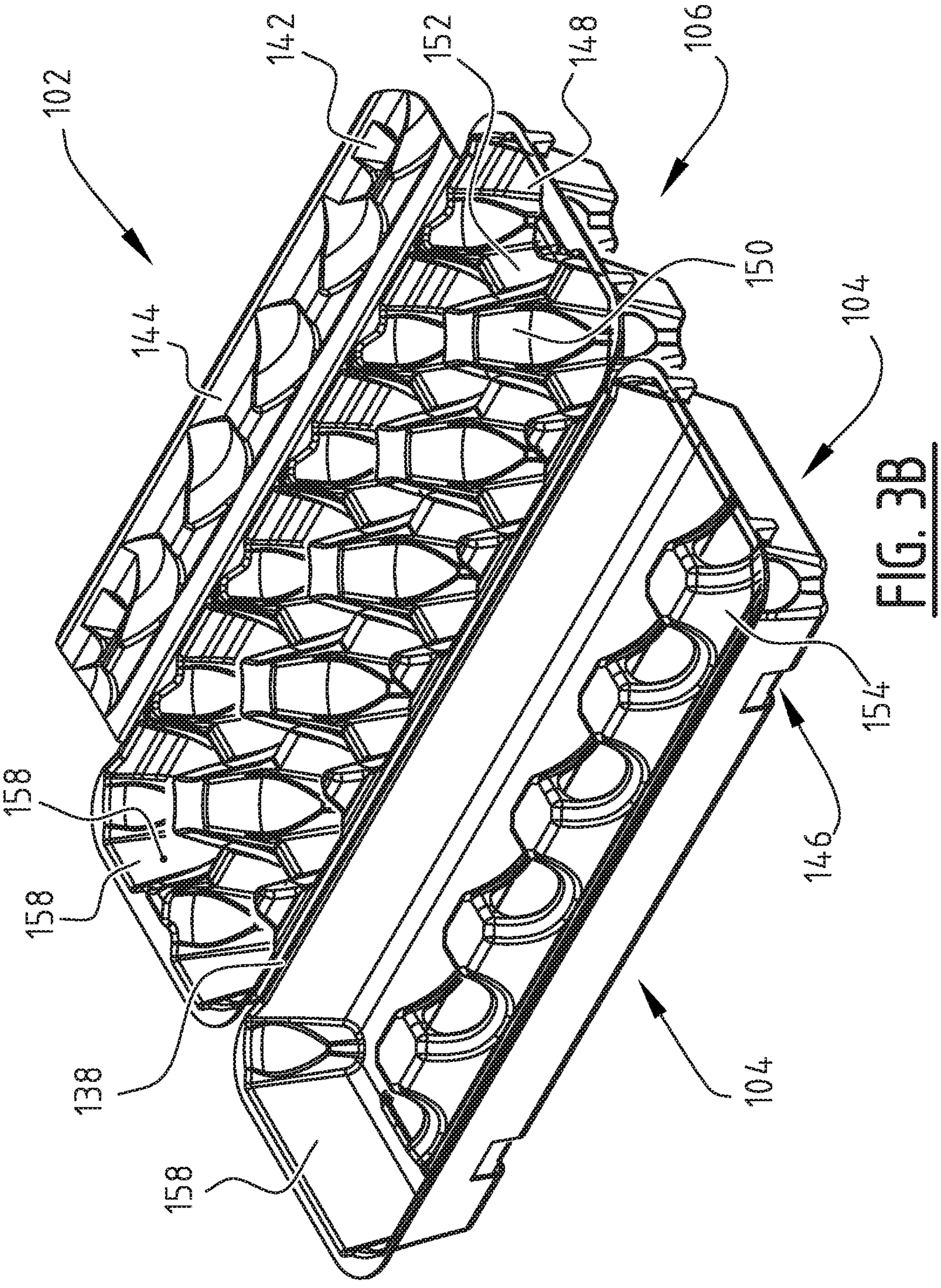

Packaging unit 102 (FIGS. 3A and B) carries or holds eggs and comprises cover part 104 and bottom part 106. In the illustrated embodiment packaging unit 102 comprises laminate layer 101. Bottom part 106 is provided with back surface 108, sides 110 and front surface 112, and bottom surface 114. Cover part 104 is provided with back surface 116, side surfaces 118, front surface 120 and top surface 122. In the illustrated embodiment transition 124 is provided between top surface 122 and back and front surfaces 116, 120.

In the illustrated embodiment, top surface 122 of cover part 104 is provided with groove 126 comprising a number of openings 128. Openings 128 are defined by two adjacent arch-shaped edges 130, 132 having a larger thickness as compared to the average thickness of cover part 104. Side surfaces 118 of cover part 104 are provided with denest nocks or denest elements 134. In the illustrated embodiment, bottom part 106 is provided with similar elements 136 mirroring denest elements 134. Hinge 138 connects back surface 116 of cover part 104 with back surface 108 of bottom part 106. Lock 140 comprises nose-shaped lock element 142 that is connected to flap 144 of bottom part 106. Cover part 104 is provided with openings 146 that capture lock elements 142 therewith defining lock 140.

In the illustrated embodiment, bottom part 106 is provided with a number of product receiving compartments 148, cones 150 and separating walls 152. Cone 150 extends from the bottom of bottom part 106 in an upward direction. Cover part 104 comprises cone support 154. Inner surface 158 of packaging unit 102 comprises PBS and/or PLA material, optionally as film layer or alternatively blended and/or integrated with the fibres of the moulded pulp material.

In the illustrated embodiment, packaging unit 102 comprises twelve product receiving compartments 48 that are provided in two rows of six compartments 148. Individual compartments 48 are separated from each other by walls 152 and cones 150. It will be understood that other configurations can also be envisaged in accordance to the invention.

Packaging unit 102 may also be configured to receive other products, such as tomatoes, kiwis.

It will be understood that other types of food packaging units can also be envisaged in accordance with the present invention.

Figure 4:
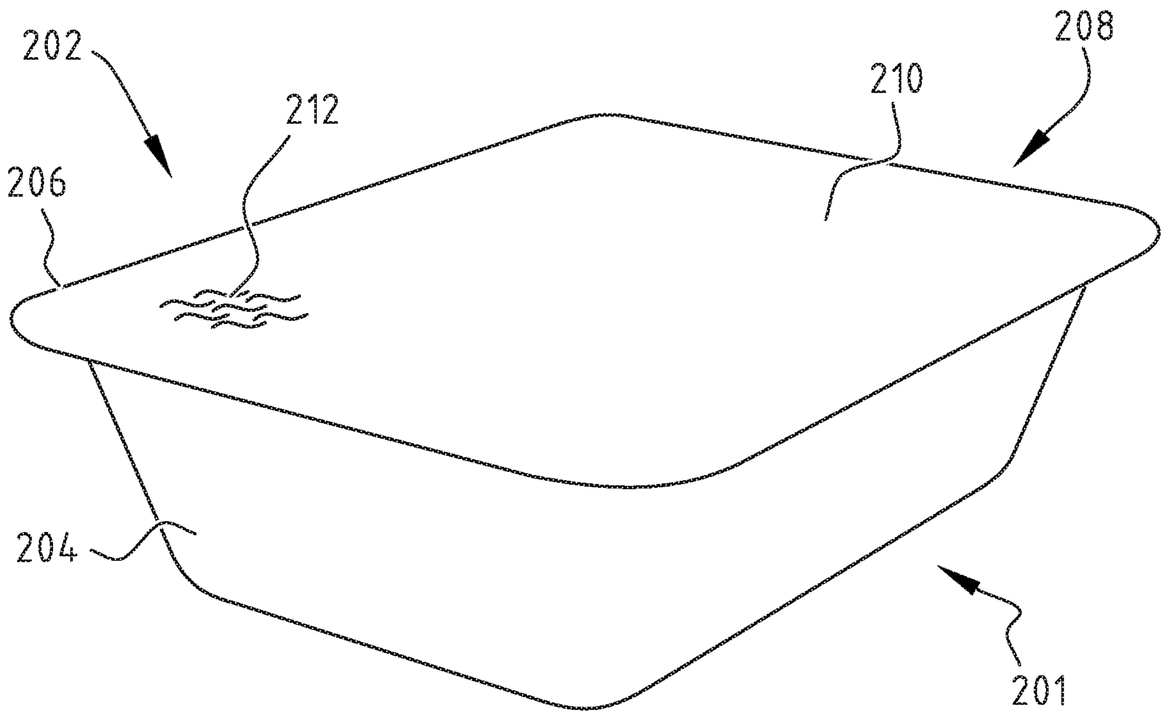
FIG. 4 shows an example of an alternative food packaging product according to the present invention.

Packaging unit 202 (FIG. 4) comprises laminate layer 201 that is provided on bottom part 204 and cover part 206. Unit 202 is provided with biodegradable aliphatic polyester, such as PBS and/or PLA, and is capable of holding an amount of ice cream. Cover part 206 comprises top seal 208 of a (paper) label whereon layer or film 210 of biodegradable aliphatic polyester(s) is provided. Optionally, fibers 212 are included in the cover part 206. This improves the possibilities for giving the unit a natural paper feel and/or look. This may also be applied to other type of packaging units. For example, in instant or ready-to-eat meals, such that conventional sleeves can be omitted from the packaging units. This enables a more cost-efficient packaging unit with a possible weight reduction.

Figure 5:
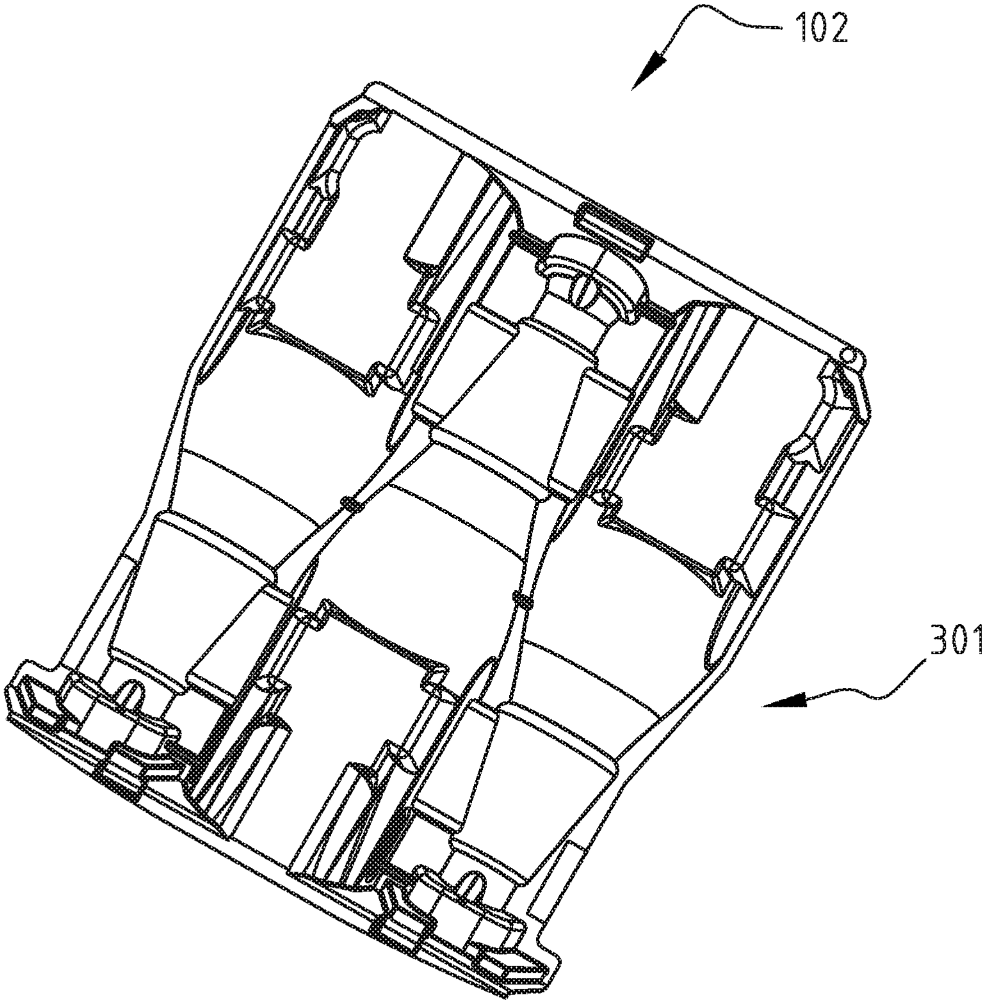
FIG. 5 shows further packaging units for a bottle divider according to the present invention.

As a further example, bottle divider 302 (FIG. 5) is illustrated with cellulose-based laminate layer 301. Also, bottle divider 102 may comprise an additional film layer of PBS (and/or appropriate alternative biodegradable aliphatic polyester) and/or may comprise an amount of PBS that is blended into the moulded pulp.

Figure 6A:
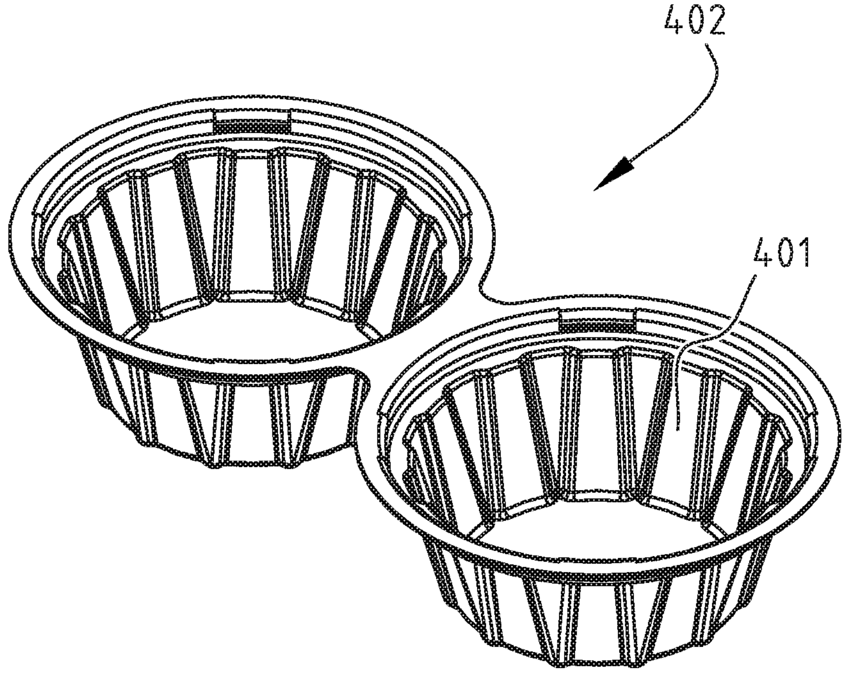
FIGS. 6A and 6B show further packaging units according to the invention.
Figure 6B:
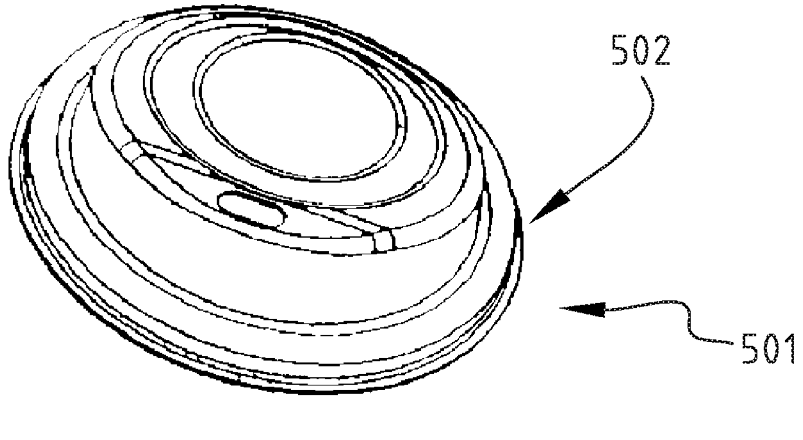

A further example in accordance with the present invention is cover 402, for example for an ice cup (FIG. 6A) that is provided with laminate layer 401. Another example of a packaging unit according to the invention is sip lid 502 (FIG. 6B) that is provided with laminate layer 501. Cover 402 and sip lid 502 comprise an additional film layer of biodegradable aliphatic polyester and/or may comprise an amount of biodegradable aliphatic polyester that is blended into the moulded pulp. This renders cover 402 and sip lid 502 water or liquid repellent and/or improves the heating step to melt or fuse cellulose-based layer 401, 501 on or to cover 402 and/or sip lid 502. One of the further advantages of the use of biodegradable aliphatic polyester is the reduction or prevention of the liquid entering or migrating into the sip lid material during use. Another advantage is the constancy of size or dimensional stability. In this specific case this prevents sip lid 502 loosening from a cup or beaker for hot beverages such as coffee, tea or soup, or cold beverages such as carbonated drinks, and cup 402 from loosing from an ice cup, for example. It will be understood that such lids 502 can also be applied to other food containers. For example, lids 502 can be applied to containers for milkshakes, for example. Further details and examples of lids 502 are disclosed in WO 2010/064899, including embodiments with specific flanges and notches.

Sip lid 502 is preferably coated with a biodegradable aliphatic polyester liner, such as a PBS liner in addition to cellulose-based laminate layer 501 to improve the melting properties. As mentioned, sip lids 502 can be used for cups and milkshakes. Also, sip lids can be applied to so-called ready meal trays (for example for pizza, wraps, fish, meat, lobster, pasta, . . . ) and act as a (digital) printable and barrier seal, for example.

Figure 7A:
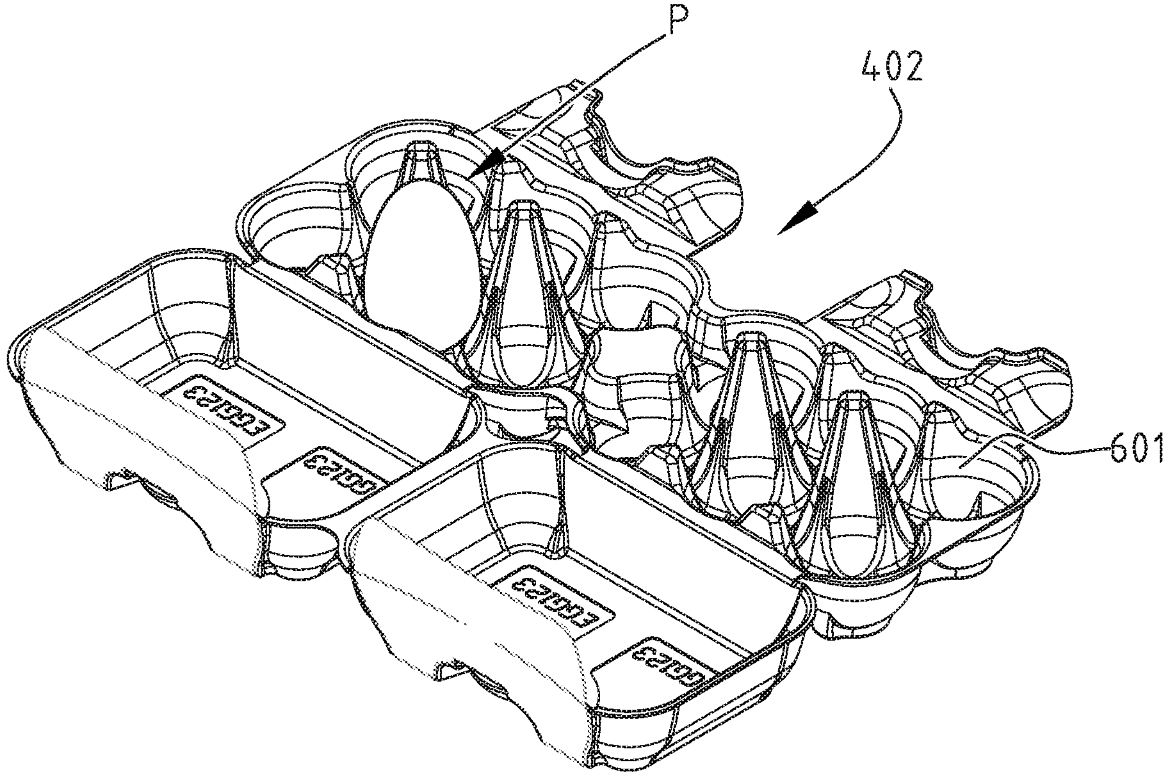
FIGS. 7A and 7B show a packaging unit for eggs according to the invention.
Figure 7B:
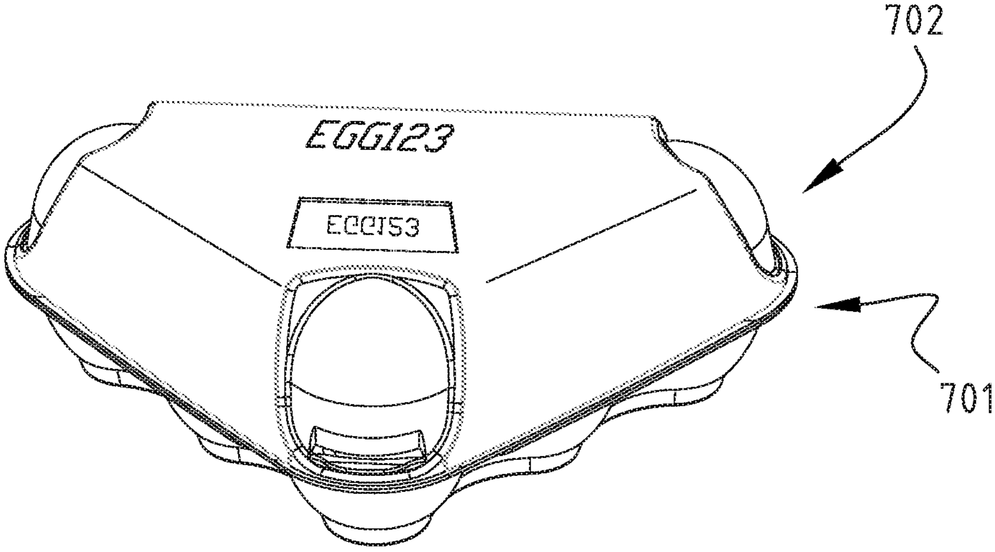

It will be understood that other designs for packaging units in accordance with the invention can be envisaged. For example, containers 602, 702 (FIGS. 7A and B) illustrate different designs for egg cartons capable of holding eggs P and comprise cellulose-based laminate layer 601, 701.

Other examples of food packaging products may relate to cup carriers, cups, plates and other table ware etc.

When manufacturing a food packaging unit 2, 50, 102, 202, 302, 402, 502, 602 a moulded pulp material is prepared. Optionally, an amount of biodegradable aliphatic polyester, such as PBS, is blended or mixed into the moulded pulp material and/or an amount of PBS is included in a separate layer that is provided in or on unit 2, 50, 102, 202, 302, 402, 502, 602. Such separate layer may improve the contact with cellulose-based laminate layer 10, 52, 101, 201, 301, 401, 501, 601. Preferably, the raw unit is moulded. Optionally, the raw unit is dried in the mould applying an in-mould drying process. In a presently preferred embodiment cellulose-based laminate layer 10, 52, 101, 201, 301, 401, 501, 601 is provided in the mould and a heating step is performed. Optionally, an additional layer of biodegradable aliphatic polyester is provided to improve the contact between the packaging unit and the laminate layer. Finally the product is released from the mould. Several post-moulding operations may optionally be performed in relation to unit 2, 50, 102, 202, 302, 402, 502, 602 optionally including, but not limited to, labelling including in-mould labelling, marking including printing and digital printing, testing. In several of the preferred embodiments, the compostable laminate layer 10, 52, 101, 201, 301, 401, 501, 601 is at least arranged on the food contact area of the product containing part of the packaging unit. In preferred embodiments this film is capable of being used in a microwave or oven as a so-called ovenable film. Preferably, layer 10, 52, 101, 201, 301, 401, 501, 601 is capable of withstanding temperatures up to 170° C., 190° C., or even higher. The biodegradable aliphatic polyester preferably comprises an amount of PBS and/or MFC and/or biodegradable aliphatic polyester that may comprise an amount of one or more of PHS, PHA, PCL, PLA, PGA, PHBH and PHBV. Especially a combination of a compostable packaging unit involving in-mould drying further improves the sustainability as compared to conventional packaging units. The (digital) printable properties enable printing of packaging and/or food characteristics/information. This may obviate the use of separate sleeves, for example. In addition, it enables the application of prints, for example a fish&chips (newspaper) print on the packaging unit.

Experiments have been performed with one or more of the illustrated food packaging units that were provided with cellulose-based layer 10, 52, 101, 201, 301, 401, 501, 601. These experiments involved comparing the "in-use" characteristics of the food packaging units as compared to conventional packaging units, and also the compostable characteristics. An amount of a biodegradable aliphatic polyester was added to the moulded pulp material and a refining step was performed. Measurements were done at a temperature of about 23° C. and a relative humidity of about 50%. Measurements involved a compression test. This showed a significant improvement in compression value. For example, a packaging unit with 7.5% PLA and a refining step showed a compression value of 450-500 N, while for a similar conventional product under the same conditions this value is about 180 N. Even a sub-optimal conditions of RH about 90% the compression value for the packaging unit according to the invention was about 250-270 N, thereby still outperforming the conventional product at its optimal conditions.

Other tests were performed to show the dual ovenable (oven and microwave) performance of the packaging unit according to the invention. In the experiments the laminated product was heated to a temperature of about 190° C. for about 30 minutes. Results show that the film layer remains intact and does not melt. Furthermore, the strength and stability of the packaging unit were not significantly affected. As a further effect, the packaging unit was more stable in view of twisting when removing the packaging unit from the oven as is often the case with conventional packaging units. Furthermore, the packaging unit of the invention showed a limited temperature increase to about 50-70° C., while the conventional units reached a temperature of about 90-100° C. under similar conditions. Other experiments with a (food) tray shows an even improved heat resistance when heating the tray to a temperature of 180-200° C., and in addition shows (an improved) oil, acid and moisture resistance/repellence.

Additional tests compared the temperature on the outside of the product packaging after cooking ("cool to touch") with different types of meals by heating in both the microwave and oven between a conventional packaging unit from CPET (Crystalline Polyethylene Terephthalate) and a packaging unit that is 100% biodegradable and made from moulded fibre. The cooking instructions for the ready meals were:

Microwave: 5 minutes at 700 Watt;

Oven: 30 minutes at 180° C. (air heated).

For the measurements, an IR (infrared) thermometer was used to observe the temperature on the outside of different parts of each tray/packaging unit.

Figure 8:
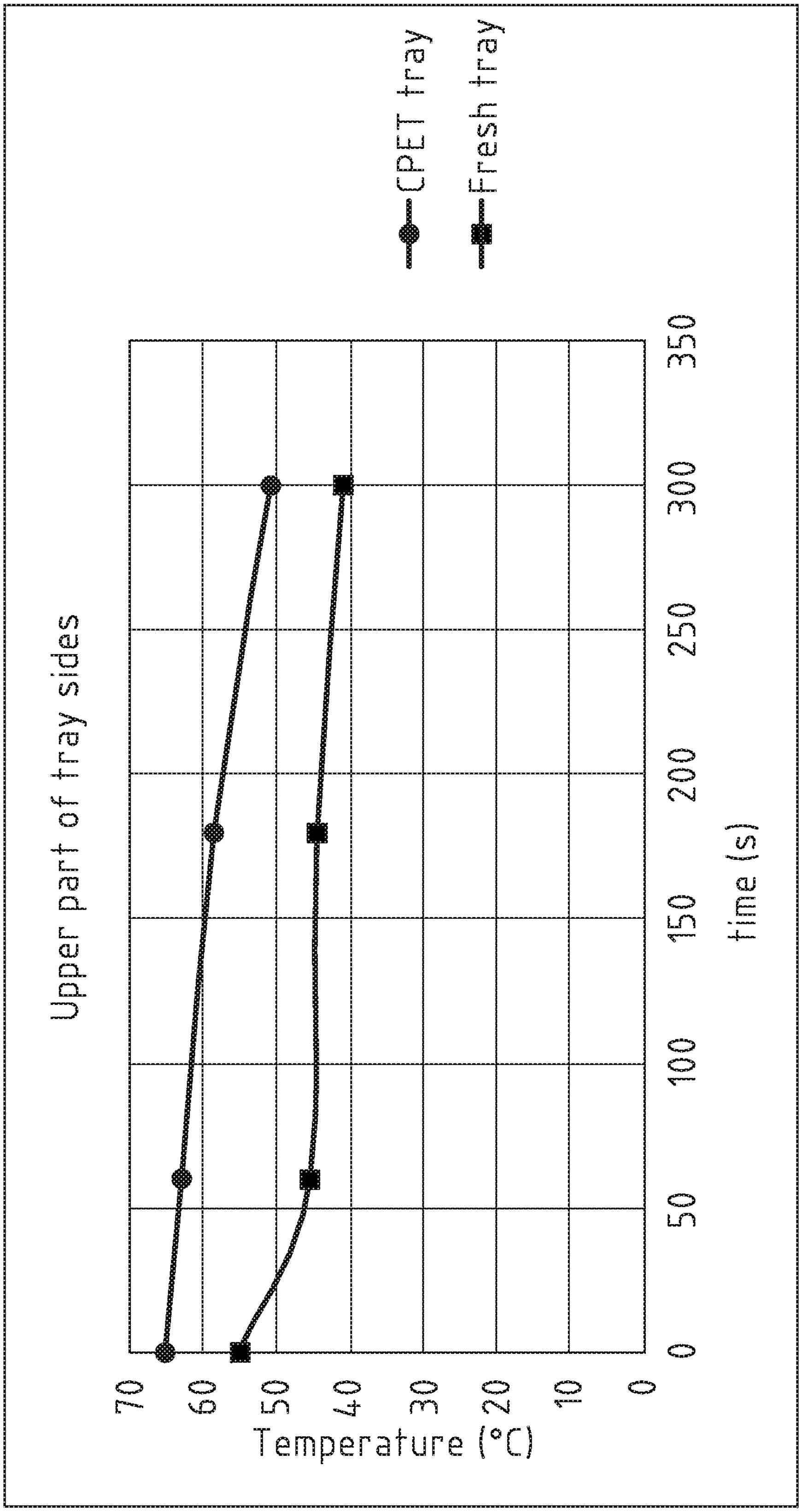
FIG. 8 shows experimental results with conventional packaging units and packaging units according to the present invention.

Temperature of the food trays was measured regularly, starting directly after being taken out of the oven/microwave. Results for temperatures at the upper part of the trays are shown in FIG. 8 and are representative for the entire packaging units.

Results clearly show a substantial temperature difference in the range of 10-15° C. showing that the packaging unit according to the invention is cooler when being touched by a user. Food temperatures are similar in both packaging units during the entire time period. During the experiments it was observed that the CPET trays became "wobbly"/unstable after heating.

In still further tests other characteristics were examined. It was shown that wipeability of the packaging unit could be improved. Further improvements where shown by addition of further additives.

The present invention is by no means limited to the above described preferred embodiments thereof. The rights sought are defined by the following claims, within the scope of which many modifications can be envisaged.

The invention claimed is:

1. Food packaging unit from a moulded pulp material, the packaging unit comprising a food receiving or carrying compartment having a food contact surface, wherein the moulded pulp material comprises an amount of a biodegradable aliphatic polyester mixed therein;

wherein the food contact surface comprises a laminate layer comprising cellulose fibres;

wherein the food packaging unit is a compostable food packaging unit;

wherein the cellulose fibres of the laminate layer are melted or fused with the biodegradable aliphatic polyester mixed into the moulded pulp material and are configured to improve an adherence of the laminate layer comprising cellulose fibres to the moulded pulp material;

wherein the biodegradable aliphatic polyester comprises polybutylene succinate (PBS) in the range of 2-10 wt. % by weight of the food packaging unit; and wherein the food contact surface comprises a layer of PBS disposed between the moulded pulp material and the laminate layer comprising cellulose fibres.

2. Food packaging unit according to claim 1, wherein the layer of PBS disposed between the moulded pulp material and the laminate layer comprising cellulose fibres improves melting or fusing of the laminate layer comprising cellulose fibres with the moulded pulp material of the packaging unit.

3. Food packaging unit according to claim 1, wherein the packaging unit comprises a circumferential edge comprising a connecting surface that is substantially free of the laminate layer to enable providing a transparent layer as closure of the packaging unit.

4. Food packaging unit according to claim 1, wherein the laminate layer comprising cellulose fibres comprises a colouring agent.

5. Food packaging unit according to claim 4, wherein the colouring agent is biodegradable.

6. Food packaging unit according to claim 1, wherein the laminate layer comprising cellulose fibres comprises a print.

7. Food packaging unit according to claim 6, wherein the print is provided on the moulded pulp material side of the laminate layer comprising cellulose fibres in a mirror image such that the print can be seen from the food side of the cellulose-based laminate layer.

8. Food packaging unit according to claim 1, wherein the unit is biodegradable at a temperature in the range of 5 to 60° C.

9. Food packaging unit according to claim 1, wherein the biodegradable aliphatic polyester is bio based.

10. Food packaging unit according to claim 1, further comprising an amount of natural and/or alternative fibers.

11. Food packaging unit from a moulded pulp material, the packaging unit comprising a food receiving or carrying compartment having a food contact surface, wherein the moulded pulp material comprises an amount of a biodegradable aliphatic polyester mixed therein;

wherein the food contact surface comprises a laminate layer comprising cellulose fibres; and wherein the food packaging unit is a compostable food packaging unit, wherein the cellulose fibres of the laminate layer are melted or fused with the biodegradable aliphatic polyester mixed into the moulded pulp material and are configured to improve an adherence of the laminate layer comprising cellulose fibres to the moulded pulp material, wherein the amount of biodegradable aliphatic polyester is in the range of 2-10% by weight of the food packaging unit, and wherein the food contact surface comprises a layer of biodegradable aliphatic polyester disposed between the moulded pulp material and the laminate layer comprising cellulose fibres.

* * * * *